United States Patent [19]

Fiala

[11] 4,097,838
[45] Jun. 27, 1978

[54] SEISMIC RODENT CONTROL DEVICE

[76] Inventor: Engelbert Fiala, 218 Dowling Ave., W., Transcona, Canada

[21] Appl. No.: 801,103

[22] Filed: May 27, 1977

[51] Int. Cl.² .............................................. H04B 11/00
[52] U.S. Cl. .......................................... 340/15; 43/124
[58] Field of Search ............................. 340/15; 43/124

[56] References Cited

U.S. PATENT DOCUMENTS

| 1,953,677 | 4/1934 | Glover | 43/124 |
| 3,891,962 | 6/1975 | White | 340/15 |

Primary Examiner—Maynard R. Wilbur
Assistant Examiner—T. M. Blum
Attorney, Agent, or Firm—Stanley G. Ade

[57] ABSTRACT

A generator vibrates low frequency sound vibrations and magnetic fields with superimposed high frequency noise which upsets the habits of rodents and most burrowing animals. The sounds are transmitted to the ground by the generator being connected to a pipe or shaft embedded in the ground, to buildings, structures or to water pipes which run underground. The circuitry permits random frequencies to be generated at random intervals by the use of cycling thermostats in circuit with the sound generator. The thermostats cycle due to the heat of the coils or resistors or from an electronic randomizing control circuit.

16 Claims, 10 Drawing Figures

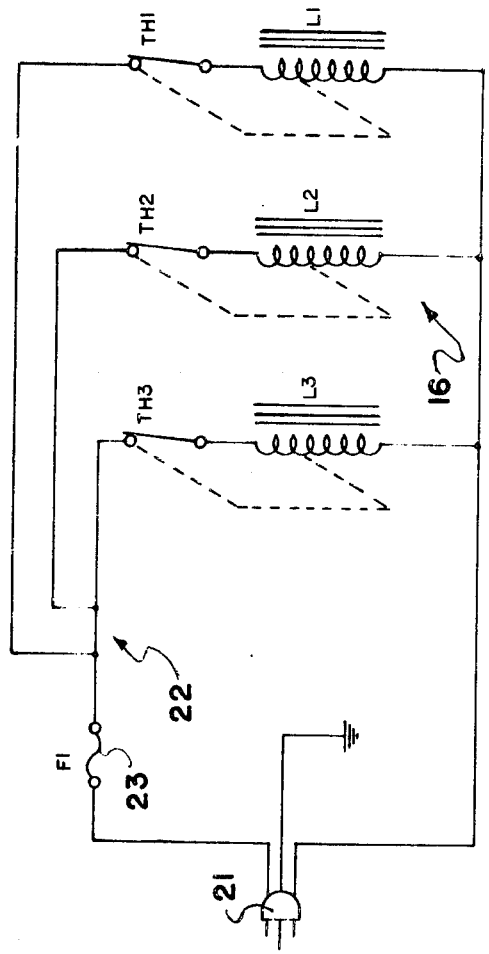
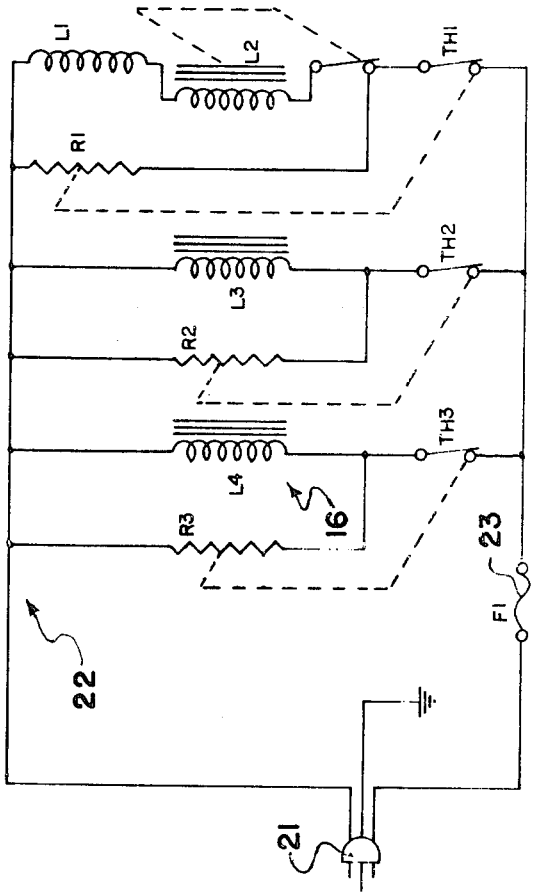
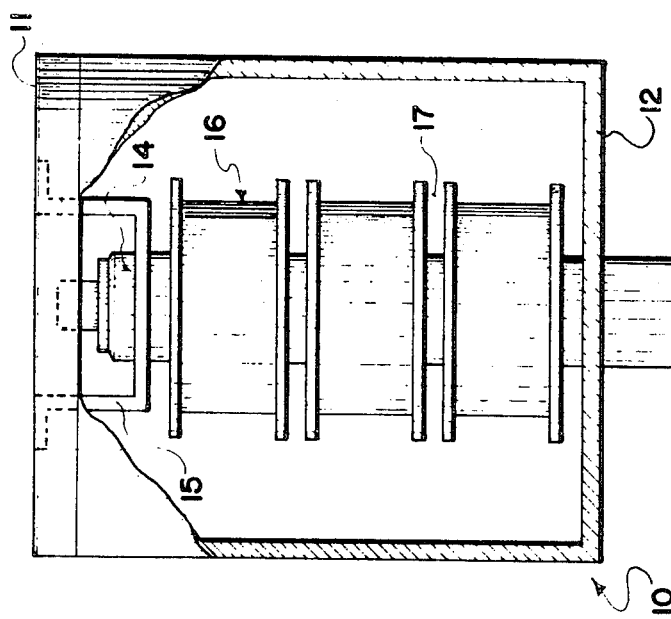

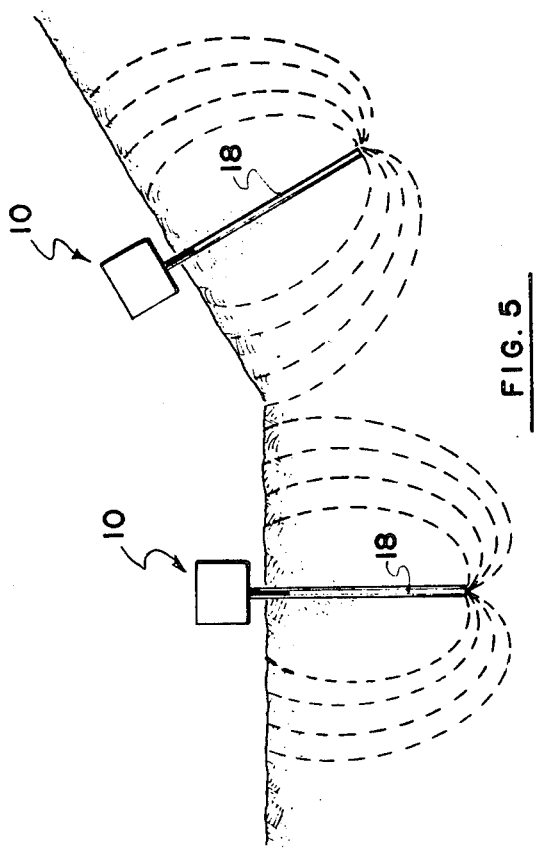
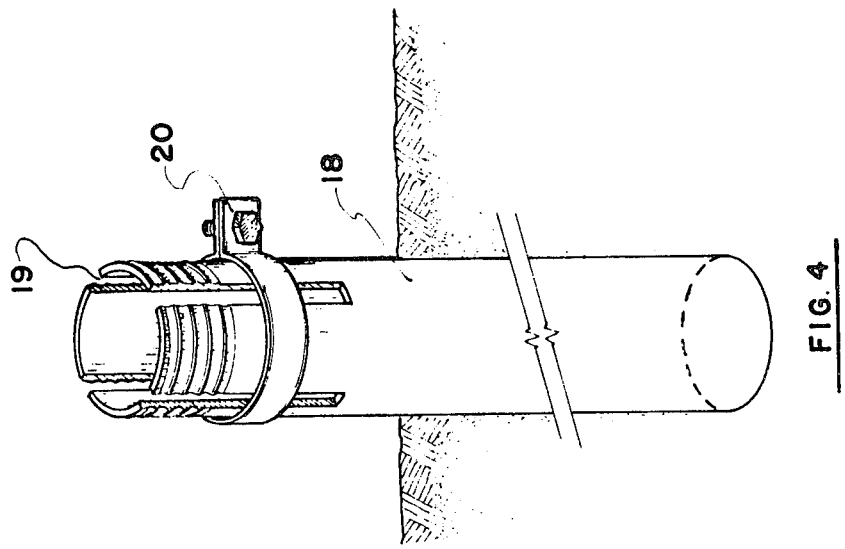

SEISMIC RODENT CONTROL DEVICE

BACKGROUND OF THE INVENTION

This invention relates to new and useful improvements in seismic rodent control devices.

Attempts have been made in the past to produce devices which utilize high or low frequency generators which in turn is transmitted to below ground whereby this vibration disturbs the rodents and hopefully causes them to leave the vicinity.

Both audio frequencies and frequencies above the audio level have been used, but it has been found that rodents, burrowing animals and the like soon become used to the level of vibration so that the initial beneficial effect is lost.

SUMMARY OF THE INVENTION

The present invention overcomes these disadvantages by providing a frequency generator together with means whereby both the frequency level and the time intervals occur randomly thus preventing rodents, burrowing animals and the like from becoming used to one set frequency.

One aspect of the invention consists of a device for disturbing the habitat of rodents, burrowing animals and the like, in conjunction with a source of electrical power; comprising in combination at least one frequency generator, casing means to support said generator, circuit means operatively connecting said generator to said source of electrical power, means to vary the frequencies generated by said generator, means to transmit vibration generated by said generator to the sub surface of the ground, said means to vary the frequency including at least two cycling thermostats operatively connected to said generator and to said circuit means for making and breaking the circuit means with said generator, a source of heat operatively connected to said thermostats to operate same in a random fashion and at random time intervals, said circuit means including means to connect and disconnect said source of heat with said thermostats coincident with the making and breaking of said circuit means with said generator.

Another object of the invention is to provide a device of the character herewithin described which may be connected to a ground anchor, to the framework of a building, to metal fence posts, or in proximity with buried conduits such as water or electrical conduits, depending upon installation circumstances.

Another object of the invention is to provide a device of the character herewithin described which although designed primarily for use with burrowing animals or rodents, nevertheless can be used above ground within building structures providing the frequencies can be transmitted to the building structure without damage occuring thereto.

A still further object of the invention is to provide a device of the character herewithin described which can be randomized electronically or by relatively simple resistor or coil circuitry.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a side elevation of one embodiment of the device sectioned in part to show the interior thereof and showing same mounted to the upper end of an anchor tube.

FIG. 2 is a schematic wiring diagram of one arrangement of FIG. 1.

FIG. 3 is a schematic wiring diagram of an alternative arrangement for FIG. 1.

FIG. 4 is an isometric view of one embodiment of the ground anchor per se.

FIG. 5 is a schematic view showing how one or more devices may be installed.

In the drawings like characters of reference indicate corresponding parts in the different figures.

DETAILED DESCRIPTION

Figure 7:
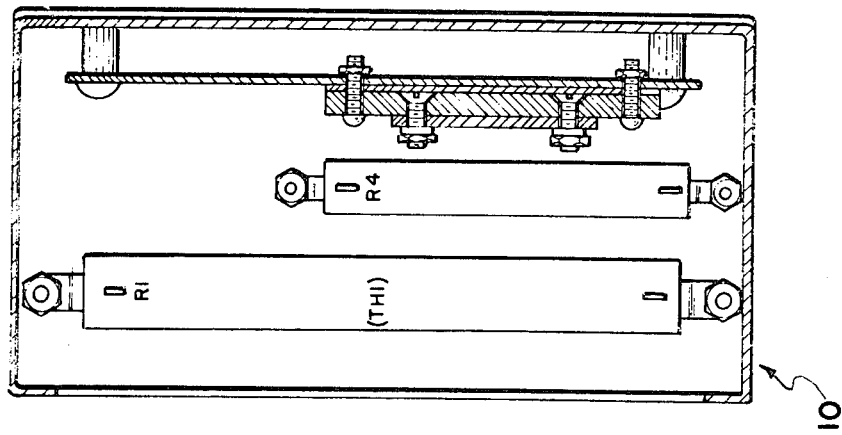
FIG. 7 is a section substantially along the line 7—7 of FIG. 6.

Proceeding therefore to describe the invention in detail, an electrical or electronic vibrator generates low frequency sound vibrations and magnetic fields with some superimposed high frequency noise which, when transmitted to the ground or the building, upsets the habits of rodents and most burrowing animals.

An important feature of the invention is the fact that the frequencies or vibrations produced, are random both in intensity, frequency and time interval so that the rodents or animals affected thereby do not have the opportunity of becoming used to one steady sound.

The randomizing control is achieved by thermal cycling of thermostats operated from the heat of coils or resistors or by electronic randomizer control circuitry.

In detail and dealing first with FIG. 1, reference character 10 illustrates a substantially boxlike enclosure which may take any convenient configuration, but which includes an upper side 11 and a base 12 through which a mounting shaft 13 extends upwardly into the enclosure or casing 10. The upper end 14 of this shaft 13 engages through a bridging piece 15 secured to the upper side 11 as by welding or the like so that the shaft is, in effect, operatively connected to the casing through the bridging piece 15.

A plurality of electromagnetic coil assemblies 16 are mounted loosely on shaft 13 within the enclosure 10 with a relatively small space being provided therebetween as indicated by reference character 17.

The windings of adjacent coils 16 is opposite so that repulsion takes place when the adjacent coils are energized as will hereinafter be described.

Although three coils are shown in FIG. 1, nevertheless two, three and up to five or more coils may be mounted upon the shaft 13 depending upon design parameters and the location and intensity required. When energized, the coils vibrate vertically upon shaft 13 and mechanically strike the bridging piece 15 together with base 12 thus producing a vibration which is transmitted from the casing to shaft 13 and hence into the ground through an anchor tube 18 to which the device is attached.

FIGS. 4 and 5 show examples of the use of anchor tube 18 which is preferably a hollow metal tube driven into the ground with the upper end portion extending above the ground. This upper end portion is vertically slotted as at 19 and is provided with a clamp assembly 20 so that when the lower end of shaft 13 is inserted within the upper end of anchor tube 18, it may be clamped firmly in position by means of the clamp 20 as clearly illustrated, thus transmitting vibration from the shaft 13, to the anchor tube 18 and hence to the ground in which the anchor tube is driven.

FIGS. 2 and 3 show the schematic diagrams of two embodiments of the device illustrated in FIG. 1.

In FIG. 2, power plug 21 engages circuitry collectively designated 22 with a source of electrical power (not illustrated) in the usual way, and fuse 23 protects the circuitry conventionally.

Coils generally designated 16 are illustrated as L1, L2, L3, etc., and are parallel one with the other and cycling thermostats TH1, TH2, TH3, etc., are in series with the coils L1, L2, L3, etc., respectively. These thermostats are positioned closely adjacent to the coils within which they are in circuit so that the heat generated by these coils, affects the thermostats. For example, the thermostats may be embedded within the coil structure or may be secured to the outer surface thereof. The important point is that as the coils heat up, the thermostat is also heated to cut-off level at which time the thermostat will open thus breaking the circuit to the individual coil and preventing same from generating frequency or vibration.

Obviously the coils and thermostats will operate in a random fashion if only because of inaccuracies in the manufacture of such products so that at any one time, one, two or three of the coils may be operatively connected to the source of electrical power thus producing frequencies of different intensities and thus generating sound vibrations of different intensities in a random fashion and at random time intervals.

The preferred embodiment of this particular embodiment, is shown in FIG. 3 in which the thermostats TH1, TH2, TH3, etc., are heated by individual resistors R1, R2, R3, etc., which are parallel with the individual coils.

The resistors are preferably wire wound resistors over porcelain cores with the thermostat being situated within the porcelain core so that the heat of the resistor, when in circuit, heats the thermostat until cut-off level is reached whereupon the circuit is broken both to the resistor and to the coil in parallel therewith.

In this connection, coil L2 is provided with opposed winding portions L1 and L2 which reduces the vibration level when it is in circuit. It also includes thermostat TH4 which is operated by the heat generated by the coil as well as thermostat TH1 which is operated by the heat generated by resistor R1.

Once again a randomizing effect results both in the intensity levels and the time intervals of the vibrations generated by the coils.

These coils when connected to a standard source of electrical power, generate a 60 Hz sound vibration and a 60 Hz magnetic field with superimposed random high frequency sound vibrations, the sound vibrations and magnetic field varying in amplitude duration and intervals in a random sequence.

Voltage may be either 115 or 220 depending upon what is available and the design of the individual generators.

Figure 10:
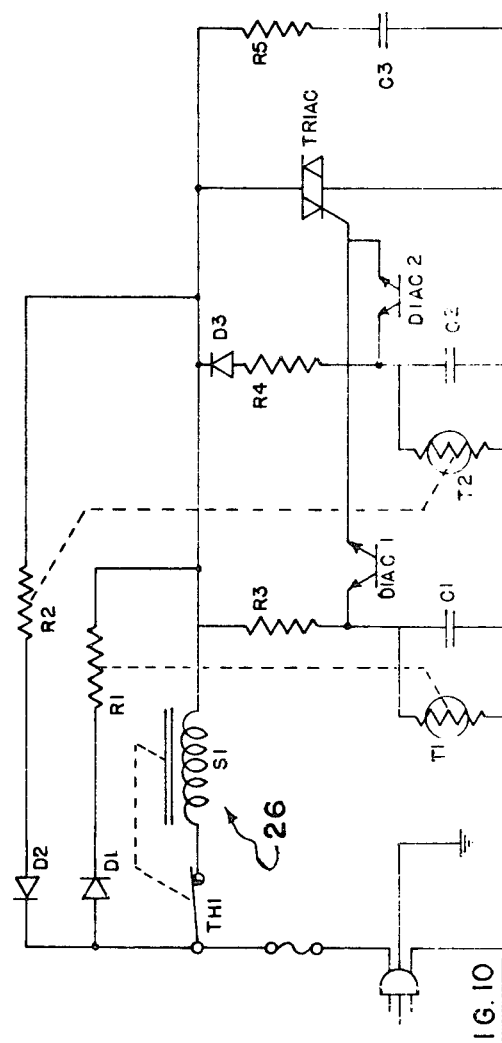
FIG. 10 is a schematic diagram of the circuitry for an electronic randomizer for the device illustrated in FIG. 6.

The coil current can also be controlled by an electronic randomizer circuit as illustrated in FIG. 10.

The preferred embodiment is shown in FIGS. 6 through 9 in which reference character 10 illustrates the enclosure or box-like casing with the mounting shaft 13 extending upwardly into the casing through grommet 24.

A cover shown partially by reference character 25, covers the open front of the casing or enclosure 10.

The frequency generator in this embodiment, takes the form of a solenoid assembly collectively designated 26 and operatively connected to the upper end of shaft 13 within the casing or enclosure 10.

The solenoid 26, which is conventional, is secured to the rear wall of the casing by means of bolts 27 and the reciprocating core 28, the majority of which is within the solenoid body 29. The distal end of the core 28 is secured to the upper end of the shaft 18 by nut and bolt assembly 30. Two small spacers 31 are provided within the solenoid to permit the vibratory action when current is flowing and in effect, the shaft 13 is held stationary with the body of the solenoid and the casing vibrating or moving vertically and transmitting this vibration to the shaft 13 and hence to the anchor tube 18 which is similar to anchor tube 18 hereinbefore described.

Figure 9:
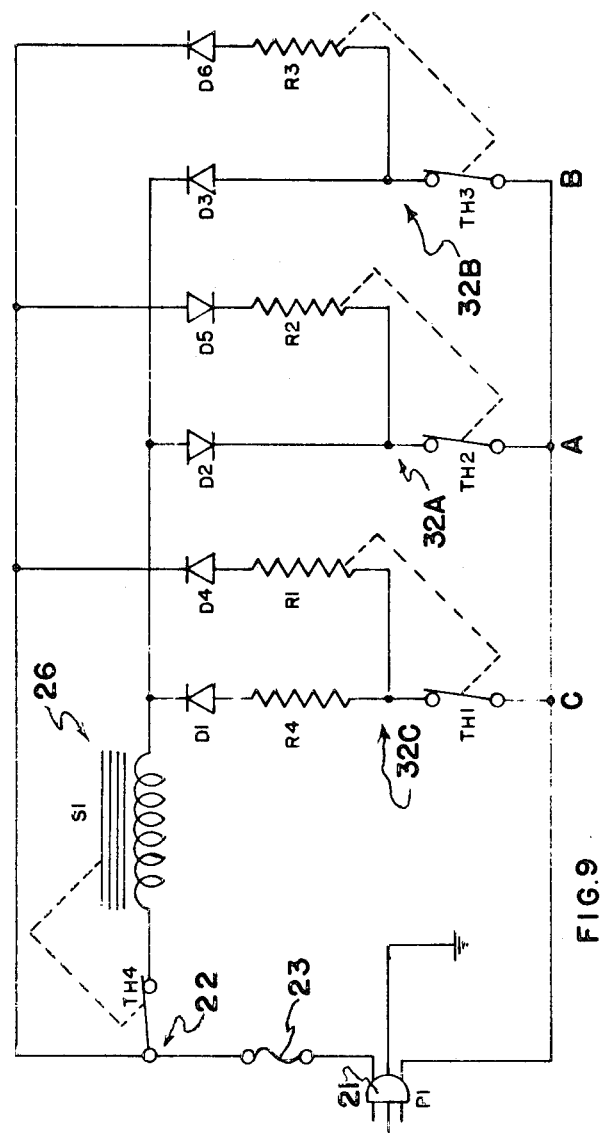
FIG. 9 is a schematic diagram of the circuitry for the device illustrated in FIGS. 6, 7 and 8.

Once again the frequency varies in intensity and time interval together with an increase or decrease in the frequency level as will be seen from the schematic diagram illustrated in FIG. 9.

Circuitry 22 includes plug 21 and fuse 23 and also includes three distinct legs 32A, 32B and 32C in parallel with one another.

The solenoid assembly 26 includes a protective thermostat TH4 which will open if the heat in the solenoid assembly 26 exceeds a pre-determined level.

Diodes D4, D5 and D6 isolate the legs one from the other and resistors R1, R2 and R3 are in circuit with the cycling thermostats TH1, TH2, TH3, etc., it being understood that the desired number of legs may be provided depending upon design parameters.

The resistor circuitry, in series with the thermostat circuitry, is in parallel with the solenoid and thermostat circuitry in each leg as clearly shown in FIG. 9 and diodes D1, D2 and D3 define the power passing through the individual legs.

For example, leg 32A provides half power to the solenoid because of the directionality of diode D2 and leg 32B also supplies half power to the solenoid due to the directionality of diode D3.

Leg 32C provides a fraction of half power to the solenoid due to the directionality of diode D1, but also due to the randomizing resistor R4 in circuit between D1 and TH1 in this particular leg.

Figure 6:
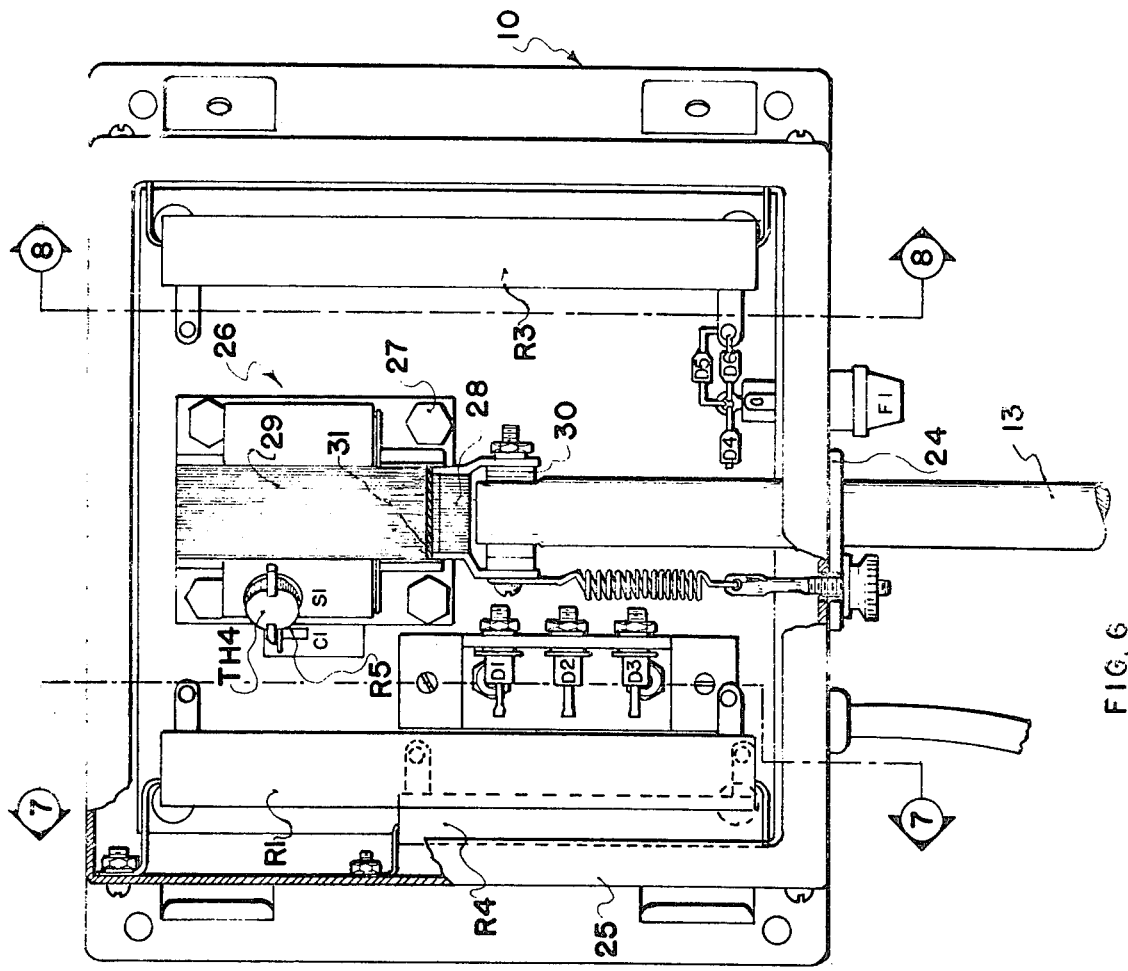
FIG. 6 is a front elevation sectioned in part of an alternative embodiment.
Figure 8:
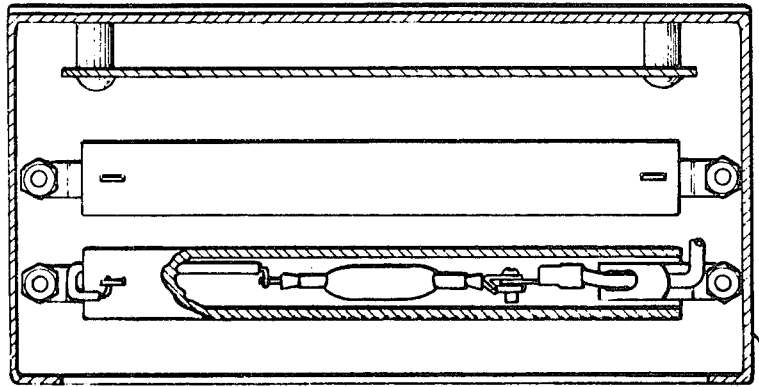
FIG. 8 is a section substantially along the line 8—8 of FIG. 6.

The thermostats TH1, TH2, TH3, etc., are mounted within hollow resistors R1, R2, R3, etc., respectively, said resistors being of a similar construction as hereinbefore described and shown schematically in FIGS. 6, 7 and 8 so that as the thermostats are heated by the individual resistors, they gradually reach the cut-off level and break the circuit in that particular leg.

This arrangement allows both 60 Hz frequency and 120 Hz frequency to be provided to the solenoid as one with the randomizing effect of the thermostats varying the time constants as well as the frequency and intensity of the vibrations produced by the solenoid S1.

FIG. 10 shows an electronic randomizing circuit in conjunction with solenoid S1 and heat protective thermostat TH1.

Two legs only are shown in this particular circuit, but of course additional legs can be provided.

Each leg is provided with a diac as shown both of which operate the triac with the thermistors T1, T2 controlled by resistors R1 and R2 respectively so that the randomizing effect is as hereinbefore described.

In this particular circuitry, T1 is in a full cycle leg whereas T2 is in a half cycle leg due to the provision of diode D3.

From the foregoing, it will be appreciated that vibrations and magnetic fields are produced, the intensity of which varies in a random fashion and at random intervals and, in one embodiment, with the frequency level also changing in a random manner.

It will be appreciated that the frequency level can be varied by well known electronic means if desired, but the conventional 60 Hz source of power has been found to be eminently satisfactory together with the doubling to 120 Hz in certain instances as illustrated and described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A device for disturbing the habitat or rodents, burrowing animals and the like, in conjunction with a source of electrical power; comprising in combination at least one frequency generator, casing means to support said generator, circuit means operatively connecting said generator to said source of electrical power, means to vary the frequencies generated by said generator, means to transmit vibration generated by said generator to the sub surface of the ground, said means to vary the frequency including at least two cycling thermostats operatively connected to said generator and to said circuit means for making and breaking the circuit means with said generator, a source of heat operatively connected to said thermostats to operate same in a random fashion and at random time intervals, said circuit means including means to connect and disconnect said source of heat with said thermostats coincident with the making and breaking of said circuit means with said generator.

2. The invention according to claim 1 in which said frequency generator comprises a mounting shaft extending into said casing means, at least two electromagnetic coil assemblies mounted for free reciprocation upon said shaft, said coil assemblies being operatively connected to said source of electric power by said circuit means, each of said coil assemblies having one of said thermostats connected in series therewith and being mounted in proximity to said coil assembly whereby the heat generated by said coil assembly when in circuit with said source of electrical power, raises the temperature of said thermostat means to cut-off temperature.

3. The invention according to claim 1 in which said frequency generator comprises a mounting shaft extending into said casing means, at least two electromagnetic coil assemblies mounted for free reciprocation upon said shaft, said coil assemblies being operatively connected to said source of electrical power by said circuit means, each of said coil assemblies having one of said thermostats connected in series therewith, said source of heat including a resistor mounted in series with said thermostat means, said thermostat means being mounted in proximity to said resistor whereby the heat generated by said resistor when in circuit with said source of electrical power, raises the temperature of said thermostat means to cut-off temperature.

4. The invention according to claim 3 in which said resistor takes the form of a wire wound hollow resistor, said thermostat means being mounted within said hollow resistor.

5. The invention according to claim 1 in which said generator takes theeform of a solenoid assembly within said casing means, a mounting shaft extending into said casing and being operatively connected to said solenoid assembly whereby vibration generated by said solenoid assembly is transmitted to said shaft, said circuit means including a plurality of legs operatively connected to said solenoid assembly and means in said legs to isolate one from the other, each of said circuit legs including a resistor and thermostat means in proximity to said resistor whereby the heat generated by said resistor when in circuit with said source of electrical power, raises the temperature of said thermostat means to cut-off temperature.

6. The invention according to claim 5 in which said resistor takes the form of a wire wound hollow resistor, said thermostat means being mounted within said hollow resistor.

7. The invention according to claim 5 in which one of said circuit legs includes means to randomize the connection of said legs to said solenoid and hence the electrical power connections thereto.

8. The invention according to claim 6 in which one of said circuit legs includes means to randomize the connection of said legs to said solenoid and hence the electrical power connections thereto.

9. The invention according to claim 1 in which said means to transmit vibration generated by said generator to the sub surface of the ground includes a tubular anchor engageable within the ground with one end extending above the ground and means to operatively connect said generator to said upper end of said tubular anchor, said last mentioned means including a mounting shaft operatively connected to said generator and engaged within said upper end of said tubular anchor and clamp means to detachably secure said mounting shaft to said upper end of said tubular anchor.

10. The invention according to claim 2 in which said means to transmit vibration generated by said generator to the sub surface of the ground includes a tubular anchor engageable within the ground with one end extending above the ground and means to operatively connect said generator to said upper end of said tubular anchor, said last mentioned means including a mounting shaft operatively connected to said generator and engaged within said upper end of said tubular anchor and clamp means to detachably secure said mounting shaft to said upper end of said tubular anchor.

11. The invention according to claim 3 in which said means to transmit vibration generated by said generator to the sub surface of the ground includes a tubular anchor engageable within the ground with one end extending above the ground and means to operatively connect said generator to said upper end of said tubular anchor, said last mentioned means including a mounting shaft operatively connected to said generator and engaged within said upper end of said tubular anchor and clamp means to detachably secure said mounting shaft to said upper end of said tubular anchor.

12. The invention according to claim 4 in which said means to transmit vibration generated by said generator to the sub surface of the ground includes a tubular anchor engageable within the ground with one end extending above the ground and means to operatively connect said generator to said upper end of said tubular anchor, said last mentioned means including a mounting shaft operatively connected to said generator and engaged within said upper end of said tubular anchor and clamp means to detachably secure said mounting shaft to said upper end of said tubular anchor.

13. The invention according to claim 5 in which said means to transmit vibration generated by said generator to the sub surface of the ground includes a tubular anchor engageable within the ground with one end extending above the ground and means to operatively connect said generator to said upper end of said tubular anchor, said last mentioned means including a mounting shaft operatively connected to said generator and engaged within said upper end of said tubular anchor and clamp means to detachably secure said mounting shaft to said upper end of said tubular anchor.

14. The invention according to claim 6 in which said means to transmit vibration generated by said generator to the sub surface of the ground includes a tubular anchor engageable within the ground with one end extending above the ground and means to operatively connect said generator to said upper end of said tubular anchor, said last mentioned means including a mounting shaft operatively connected to said generator and engaged within said upper end of said tubular anchor and clamp means to detachably secure said mounting shaft to said upper end of said tubular anchor.

15. The invention according to claim 7 in which said means to transmit vibration generated by said generator to the sub surface of the ground includes a tubular anchor engageable within the ground with one end extending above the ground and means to operatively connect said generator to said upper end of said tubular anchor, said last mentioned means including a mounting shaft operatively connected to said generator and engaged within said upper end of said tubular anchor and clamp means to detachably secure said mounting shaft to said upper end of said tubular anchor.

16. The invention according to claim 8 in which said means to transmit vibration generated by said generator to the sub surface of the ground includes a tubular anchor engageable within the ground with one end extending above the ground and means to operatively connect said generator to said upper end of said tubular anchor, said last mentioned means including a mounting shaft operatively connected to said generator and engaged within said upper end of said tubular anchor and clamp means to detachably secure said mounting shaft to said upper end of said tubular anchor.

* * * * *